United States Patent [19]

Young

[11] Patent Number: 4,740,082
[45] Date of Patent: Apr. 26, 1988

[54] SPECTROPHOTOMETER
[75] Inventor: Eugene F. Young, Wilton, Conn.
[73] Assignee: The Perkin-Elmer Corporation, Norwalk, Conn.
[21] Appl. No.: 858,555
[22] Filed: Apr. 24, 1986

Related U.S. Application Data

[63] Continuation of Ser. No. 527,884, Aug. 30, 1983, abandoned.

[51] Int. Cl.⁴ .............................. G01J 3/45; G01B 9/02
[52] U.S. Cl. .................................................... 356/346
[58] Field of Search ................................ 356/345, 346

[56] References Cited

U.S. PATENT DOCUMENTS 3,977,786  8/1976  Gast ...................................... 356/346

OTHER PUBLICATIONS

Martin, *Infrared Interferometric Spectrometers*, Elsevier Sci. Pub. Co., pp. 178, 179, 180, 182-184.
Vanasse et al, "Selective Modulation Interferometric Spectrometer Technique Applied to Background Suppression", Optical Engineering, vol. 18, No. 4, Jul.-Aug. 1979, pp. 403-408.

Primary Examiner—Davis L. Willis
Assistant Examiner—Matthew W. Koren
Attorney, Agent, or Firm—Francis L. Masselle; Ronald G. Cummings; Edwin T. Grimes

[57] ABSTRACT

A spectrophotometer includes means for ensuring that the active area of a detector is always filled regardless of the resolution aperture setting of the instrument.

6 Claims, 1 Drawing Sheet

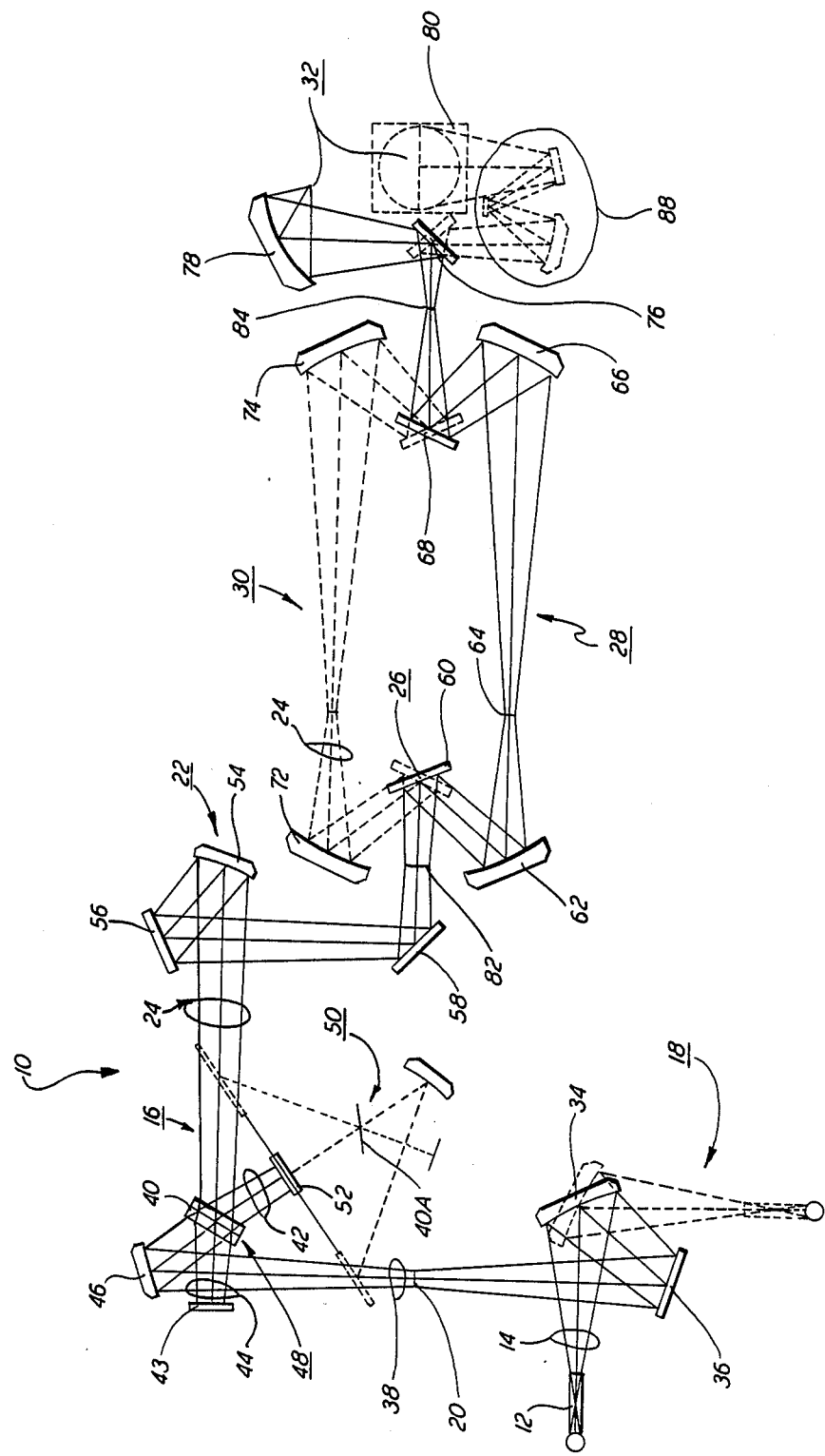

SPECTROPHOTOMETER

This application is a continuation of application Ser. No. 527,884, filed Aug. 30, 1983, now abandoned.

BACKGROUND OF THE INVENTION

The present invention generally relates to a spectrophotometer and, in particular, relates to a Fourier Transform Spectrophotometer wherein the energy sensitive area of the detector is fully illuminated regardless of the resolution setting.

In general, Fourier Transform (FT) Spectrophotometers are primarily utilized in the field of infrared analysis. Hence, such spectrophotometers are generally known as Fourier Transform Infrared (FT/IR) Spectrophotometers. The primary advantages of FT/IR spectrophotometers is that entire wavelength ranges can be analyzed faster, with more energy throughput and with reduced background stray light. Such advantages are well known in the spectrophotometer art and, consequently, have given rise to the increasing use of FT/IR spectrophotometers.

Conventionally, FT/IR spectrophotometers can be of either single beam or double beam variety. In a single beam instrument the sample is positioned in the path of the sampling light beam and subsequently removed or otherwise used to characterize a background signal. Thus, when the sample cell is removed or, for example, when the sample cell is filled with a reference fluid, the background noise signal which exists during a particular measurement can be ascertained and subsequently subtracted from the signal received when the sample is inserted in the path. Single beam instruments frequently require the disruption of the control environment in which the FT/IR functions to switch from a reference measurement to a sample measurement. Consequently, the noise measurement is neither simultaneous with the sample measurement nor is it performed under identical conditions.

As a means of avoiding this inaccuracy, double beam systems were developed and are well known in the art. In such systems, one beam is directed through the sample cell or sample material whereas a second beam, following a substantially identical optical path—except for that portion of the path passing through the sample—is introduced. Normally, this is accomplished by positioning, both before and after the sample cell, rotatable or otherwise movable mirrors, or other beam direction control optical elements. Accordingly, the incoming or incident beam directed to the sample cell is intermittently redirected along a path similar in length and other optical characteristics to that of the sample beam but which path does not contain sample. Thus, by optically subtracting the signal representative of the incident beam having passed through the sample from the beam having passed through the reference path, a more accurate measurement is achieved.

Although a double beam system, whether conventional or FT, is inherently more accurate and convenient than a single beam system, it nevertheless has a number of drawbacks when such a system is used for high sensitivity or very accurate measurements. One difficulty of the FT/IR spectrophotometers present known is that the sample beam and reference beam do not always impinge on the same area of the detector surface. This results because of the slight optical path differences caused by the presence of the sample in the sample beam path. As a result, the accuracy of the two measurements is reduced owing to the fact that different areas of the detector may produce slight differences in signal output.

This problem is particularly difficult when the area of a conventional Jacquinot stop is reduced in size to increase resolution. In addition, another image mismatch occurs at the beamsplitter of the interferometer of an FT/IR. Consequently, the beam division of the beamsplitter may be slightly different depending on the particular Jacquinot stop setting used. Such image mismatch, with respect to the beamsplitters, occurs primarily because the Jacquinot stop is focused on the detector and consequently the image thereof throughout the system, i.e., on the beamsplitter as well as various other points in the optical system, does not remain fixed when the resolution is varied via the Jacquinot stop.

SUMMARY OF THE INVENTION

Accordingly, it is one object of the present invention to provide a dual beam FT/IR spectrophotometer which produces enhanced photometric accuracy.

This object is accomplished by providing a spectrophotometer wherein the entire available detector aperture is illuminated regardless of the resolution setting of the instrument.

Other objects and advantages will become apparent to those skilled in the art from the following detailed specification read in conjunction with the appended claims and the dawing attached hereto.

BRIEF DESCRIPTION OF THE DRAWING

The single FIGURE of the drawing is an optical layout of a spectrophotometer, not drawn to scale, embodying the principles of the present invention.

DETAILED DESCRIPTION OF THE INVENTION

A spectrophotometer, generally indicated at 10 in the drawing and embodying the principles of the present invention, includes a source 12 which provides a source beam 14 of radiation including the spectral wavelengths of interest. The spectrophotometer 10 also includes an interferometer 16 as well as means 18 for directing the source beam 14 thereto through a variable aperture 20. The spectrophotometer 10 further includes means 22 for directing the beam 24 exiting from the interferometer 16 to a beam path selector 26 which routes the exiting beam 24 through either a sample path 28 or a reference path 30 prior to being directed to a detector means 32. As more fully explained below the beam 24 fills the active area of the detector means 32.

In the preferred embodiment, the source 12 is a heated wire which provides radiation between the wavelengths of 5000 and 50 wavenumbers in the infrared spectrum. As more fully discussed below the source 12 can be positioned either within the enclosure of a spectrophotometry instrument or externally thereof.

The radiation from the source 12 falls on the directing means 18 which, preferably, includes a toroidal reflector 34 for directing the source beam 14 onto a first flat mirror 36. The first toroidal reflecting surface 34 and flat mirror 36 are so positioned that the resultant beam from the first flat mirror 36 is directed toward the variable aperture 20.

The variable aperture 20, such as, for example, a Jacquinot stop, is positioned in the path of the source beam 14 and thereby controls the ultimate resolution of the instrument by controlling the cross-sectional area of the source beam 14 passing therethrough. Further, the resolution is inversely related to the aperture area, i.e., the larger the aperture area the lesser resolution achieved and vice-versa. Resolution, as used herein, is taken to mean the ability of an instrument to separate closely adjacent peaks.

The apertured beam 38 passing through the Jacquinot stop enters the interferometer 16 which includes at least a first beamsplitter 40 which redirects the incoming light thereon into two arms 42 and 44, one arm 42 having a variable length. The variable length of the one arm 42 allows the interferometer 16 to produce an interference pattern in the resultant exit light beam 24. In this embodiment, the beam passing through the variable aperture 20 is directed onto a paraboloid reflector 46 which condenses the image and directs the light beam onto the beamsplitter 40. By the presence of this condensing surface, the size of the beamsplitter 40 can be considerably reduced in size to accommodate manufacturing techniques as well as to reduce the expense thereof. Further, the use of the paraboloid reflector 46 ensures that, regardless of the setting of the variable aperture 20, the incoming beam will be directed to the same surface portion of the beamsplitter 40. Consequently, errors due to the utilization of various parts of the beamsplitter surface for various resolution apertures is avoided. In the preferred embodiment, the interferometer 16 is a conjugate interferometer having first and second interferometers, 48 and 50 the common element of which is a moving mirror 52 of the respective variable length arms 42. In such an embodiment, the beamsplitter 40A of the second interferometer 50 has a wavelength operating range which is different from the wavelength operating range of the first beamsplitter 40.

The resultant exit beam 24 of the interferometer 16 impinges upon the means 22 for directing the exit beam which, in one preferred embodiment, includes a torodial mirror 54 for condensing the resultant exit beam 24 and directing it to a flat mirror 56. Preferably, for space considerations, the flat mirror 56 then directs the beam 24 onto another flat mirror 58 which directs the beam 24 into the beam path selector 26.

In the preferred embodiment, the beam path selector 26 is a flat mirror 60 rotatable between two fixed positions. In a first position, the incoming beam 24 is reflected therefrom toward a first sample path toroid reflector 62 which condenses and forms the image of the beamsplitter 40 into the plane of the sample cell 64. The other end of the sample path is formed by a second sample path toroidal mirror 66 which condenses the expanding beam from the sample and directs it onto a second rotatable flat mirror 68. In the second, or referencing path 30, the first beam selecting flat mirror 60 directs the incoming beam to a first reference beam toroidal reflector 72 which directs the beam 24 to a second toroidal reflector 74 and subsequently onto the second beam path directing mirror 68. In order to ensure accurate optical matching of the reference beam and the sample beam, it is preferred that toroidal reflectors 62 and 66 of the sample beam path and the toroidal reflectors, 72 and 74 of the reference beam path be optically identical.

The resultant beam is imaged via either of the second toroidal mirrors, 66 or 74 and, in the preferred embodiment, directed to a detector selector mirror 76 which is rotatable between a first and second position. Regardless of the position, the detector selector mirror 76 directs the beam to either one of a first or a second identical ellipsoidal reflecting surfaces, 78 or 80, which so forms the beam that the entire active area of the detector means 32 selected is illuminated.

In a more specific operational embodiment, the toroidal reflector 34 of the beam directing means 18 has a focal length of 97.3 millimeters and is positioned at an off-axis angle of 40 degrees. As used herein, the term "off-axis angle" is defined as the included angle between an incoming central ray of an incident beam and the reflected central ray thereof. The beam directing paraboloid reflector 46 of the interferometer 16 has a focal length of 222.8 millimeters and an off-axis angle of 36 degrees, and the toroidal reflector 54 which directs the exit beam 24 of the interferometer 16 has a focal length of 360 millimeters and is positioned at an off-axis angle of 40 degrees. The four toroidal reflecting surfaces, 62, 66, 72 and 74 defining the reference beam path 30 and the sample beam path 28 all have focal lengths equal to 121.4 millimeters and are positioned at off-axes angles of 50 degrees. Finally, the ellipsoidal mirrors 78 and 80 of the detector imaging means have equivalent focal lengths of 40.3 millimeters and are positioned at off-axes angles of 60 degrees. Preferably, the detector means 32 include an MCT (Mercury/Cadmium/Telluride) and a pyroelectric detector, i.e., a temperature measuring opto-electric device.

As previously mentioned, the optical arrangement recited above is advantageous in that both a detector image and a Jacquinot stop image are positioned relatively close to the source whereby the source can either be placed inside a spectrophotometer cabinet between the images or it can be placed externally the instrument proper and nevertheless, fill the field of view of the detector image.

Furthermore, an image of the Jacquinot stop 20 formed between the second flat mirror 58 of the exit beam directing means 22 and the rotatable beam selector mirror 60 positioned can be used as a position for a polarizer 82. Further, a real image of the detector means 32, although reduced in size, is formed subsequent to the beam path combining flat mirror 68 which real image can serve as a location for a filter positioning mechanism 84 which equalizes the energy from the reference and sample beam paths 28 and 30.

Although the present invention has been described herein with reference to a specific exemplary embodiment other arrangements and configurations can also be developed without departing from the sprit and scope of the present invention. Hence, the present invention is deemed limited only by the appended claims and the reasonable interpretation thereof.

What is claimed is:

1. A spectrometer optical system comprising:
source means for generating a beam of radiation of preselected spectral wavelengths;
an interferometer including a beam splitter having a fixed aperture;
means defining a variable aperture adjustable to vary the cross-sectional area of said radiation beam and thus regulate resolution of the spectrometer;
means including a first curved reflector for focusing an image of said source means onto said variable aperture, said beam of radiation passing through said variable aperture to said interferometer;
means including a second curved reflector directing said radiation beam to illuminate said fixed beam splitter aperture;

optical means defining a sample path having a sample position and a substantially identical reference path;
a switchable beam path selector;
means including a third curved reflector for directing the radiation beam exiting from said interferometer to said beam path selector and focusing an image of said fixed beam splitter aperture at said sample position while imaging the variable aperture at a location remote from said sample position, said beam path selector being constructed and arranged to be switchable between respective positions in which said radiation beam is alternately directed along said sample path and said reference path;
photosensitive detector means; and
means including a beam path directing mirror for receiving the beam of radiation from either said sample path or from said reference path and focusing said fixed beam splitter aperture on said detector, whereby the detector is uniformly illuminated for all cross-sectional areas of said variable aperture.

2. An optical system according to claim 1 wherein said interferometer further includes a paraboloid reflector, a fixed mirror and a movable mirror, said paraboloid reflector being constructed and arranged to direct the incoming beam of radiation to substantially the same surface portion of the beamsplitter regardless of the setting of said variable aperture.

3. A system according to claim 1 wherein said means for directing the beam of radiation exiting from said interferometer includes a torodial mirror for condensing the exiting beam.

4. An optical system according to claim 1 wherein said detector means comprises a detector selector mirror rotatable between a first position and a second position for receiving the beam of radiation from said beam path directing mirror, first and second detecting means, and first and second ellipsoidal reflecting surfaces for receiving a beam of radiation from said detector selector mirror and directing it to said detecting means respectively, said ellipsoidal reflecting surfaces being constructed and arranged so that the entire active areas of said detector means respectively are illuminated.

5. An optical system according to claim 4 further including filter means disposed at a focal point between said beam path directing mirror and said detector selector mirror for equalizing the energy in said beam of radiation from the sample path and the beam of radiation from the reference path.

6. An optical system according to claim 1 wherein said means for directing the beam of radiation exiting from said interferometer includes a flat mirror for directing the beam of radiation to said beam path selector, said system further including a polarizer disposed at a focal point between said flat mirror and said beam path selector.

* * * * *